Oct. 17, 1967 W. B. ALLEN 3,348,203

SCANNED TIME COMPRESSOR

Filed Aug. 23, 1963

INVENTOR.
WILLARD B. ALLEN

BY

Paul L. Gitlin [signature]
ATTORNEYS

United States Patent Office 3,348,203 Patented Oct. 17, 1967

3,348,203
SCANNED TIME COMPRESSOR

Willard B. Allen, San Diego, Calif., assignor to the United States of America as represented by the Secretary of the Navy Filed Aug. 23, 1963, Ser. No. 304,288
4 Claims. (Cl. 340—167)

ABSTRACT OF THE DISCLOSURE

A time compressing circuit for reading digital data stored in a shift register in a time interval less than the rate that serial data bits are received at the register. A plurality of coincidence circuits equal in number to the number of register stages are connected to the register and each is enabled sequentially by a pulse travelling down a tapped delay line. The number of delay line taps equals the number of coincidence circuits. The total delay time of the line is less than the time interval between input pulses to the register. A non-recirculating register is used.

Figure 1:
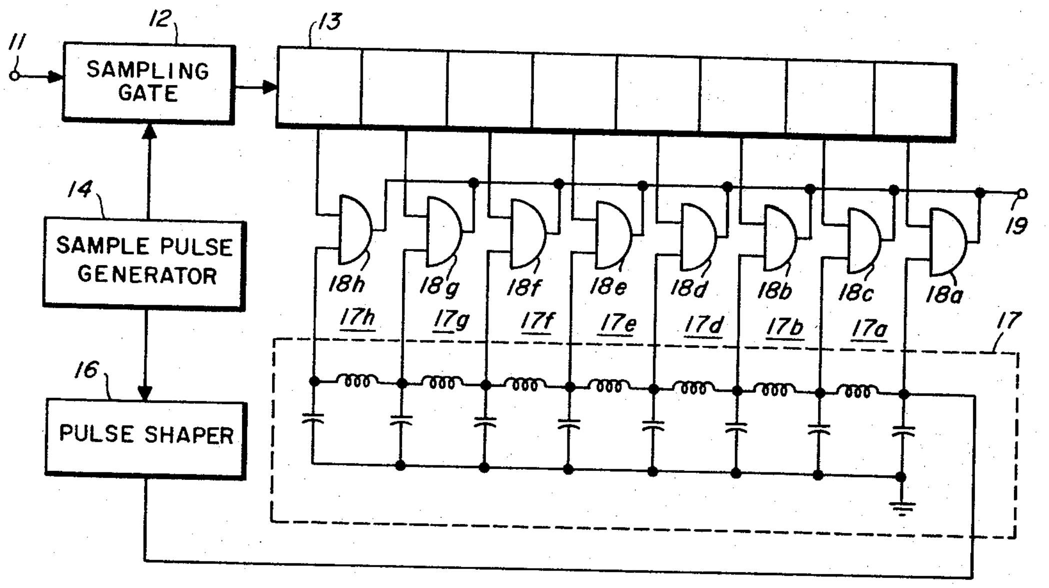

The invention described herein may be manufactured and used by or for the Government of the United States of America for governmental purposes without the payment of any royalties thereon or therefor.

The present invention relates to a scanned time compressor and more particularly, to a scanned time compressor for compressing serial information bits stored in a shift register.

The prior art methods of time compressing signals comprise, in the main, three basic philosophies. The first is simply the method of recording the signal to be compressed on a magnetic tape or drum at low speeds and playing it back at high speeds. The second method comprises converting signal samples to pulses of high frequency sound which are then recirculated through quartz or nickel delay lines at high rates, each succeeding new pulse being introduced behind the most recently stored sample after it has made one or more recirculations through the delay line. The third method utilizes a digital shift register as a delay line, the information circulating in the delay line with a new sample being added with each recirculation as in the second method.

The first method, being mechanical, suffers from the usual limitations of mechanical systems and is somewhat inflexible in operating modes and limited in compression ratios that can be achieved.

The second and third methods are recirculation type devices in which the information must recirculate completely through the memory between the addition of new samples. This has the disadvantage that the storage element be a very high speed device if the input information rate and the compression ratio are to be large. For example, with an input information rate of 2,000 samples per second and a compression ratio of 1,000 to 1 the delay element must operate at 2,000,000 bits per second.

According to the invention, a signal storage device such as a digital shift register is supplied with serial information pulses and completely read out in serial fashion between each information sample, i.e., the output is time compressed utilizing delay time techniques in the ratio of the number of signals stored in the digital shift register to 1. Hence, the necessity for recirculation in the shift register is obviated and the speed-up or compression is obtained in the scanning process.

An object of the present invention is the provision of a scanned time compressor for serially compressing serially stored information bits.

Another object is to provide a scanned time compressor for compressing bits of information stored in a shift register or other storage device (i.e., magnetic core memory) without the necessity of recirculating the stored information through the shift register.

A further object of the invention is the provision of a scanned time compressor for compressing stored bits of information which is entirely electronic in construction and operation.

Still another object is to provide a scanned compressor for compressing information bits in which the compression ratio can be easily varied.

A still further object of the present invention is the provision of a scanned time compressor for compressing information bits which is simple, inexpensive and requires a minimum of maintenance and adjustment.

Figure 2:
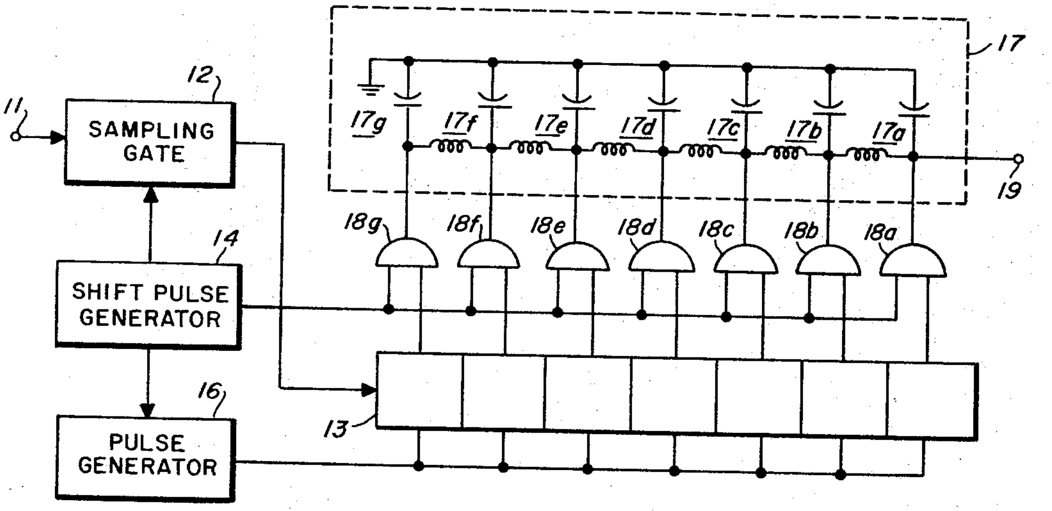

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 illustrates one embodiment of the present invention in block diagram and schematic form; and FIG. 2 illustrates another embodiment of the present invention in block diagram and schematic form.

Referring to FIG. 1, input terminal 11 is connected to one input of sampling gate 12 the output of which is connected to shift register 13. Pulse generator 14 is connected to another input of sampler 12 and to pulse shaper 16. The output of pulse shaper 16 is connected to delay line 17. Delay line 17 has incremental taps **17*a*, 17*b*, 17*c*, 17*d*, 17*e*, 17*f*, 17*g* and 17*h*, connected to one input of coincidence gates 18*a*, 18*b*, 18*c*, 18*d*, 18*e*, 18*f*, 18*g* and 18*h*, respectively. Each stage of shift register 13 is connected to another input of coincidence gates 18*a* through 18*h*, the outputs of which are all connected to output terminal 19**.

Referring to FIG. 2, input terminal 11 is connected to sampling gate 12, the output of which is connected to shift register 13. Pulse generator 14 is connected to another input of sampling gate 12 and through pulse shaper 16 to each individual stage of shift register 13. The outputs of each stage of shift register 13 are connected to an input of a different one of coincidence gates **18*a*, 18*b*, 18*c*, 18*d*, 18*e*, 18*f* and 18*g*, respectively. Another output of shift pulse generator 14 is connected in parallel to another input of each of the coincidence gates 18*a* through 18*g*. The outputs of coincidence gates 18*a* through 18*g* are connected to taps 17*a*, 17*b*, 17*c*, 17*d*, 17*e*, 17*f* and 17*g*, respectively, of delay line 17. The output of delay line 17 is connected to output terminal 19**.

*Operation*

Referring back to FIG. 1, the output of sampling gate 12 which comprises a sample of the signal at input 11 will be a series of binary level (0, 1) bits which fill up shift register 13 in serial fashion. In this regard the signal stored in the last stage of shift register 13 will fall out as the next signal moves into that stage. The output of pulse generator 14 which samples the input at 11 via sampling gate 12 is also passed through pulse shaper 16 for insertion into a passive lumped-constant delay line 17. Delay line 17 has equal time-spaced incremental taps at **17*a* through 17*h*. The total delay time of delay line 17 is equal to the period between pulses of pulse generator 14. Hence, coincidence gates 18*a* through 18*h* will read out the signal stored in shift register 13 in serial fashion as each pulse is in turn applied to coincidence gates 18*a* through 18*h*. Output terminal 19 will then see the entire stored signal of shift register 13 compressed between each pulse from pulse generator 14**.

An alternate arrangement is shown in FIG. 2 whereby the outputs of shift register 13 are taken in parallel, i.e., simultaneously with each pulse from pulse generator 14 again through coincidence gates 18*a* through 18*g*. The outputs of these coincidence gates are each fed to one section of lumped-constant delay line 17 and pass in serial time sequence down delay line 17 to output terminal 19. Again, since the information from shift register 13 is read out through coincidence gates 18 through 18*g* once with every sample input, if the total delay time of delay line 17 is equal to the period between pulses of pulse generator 14 the signal will be compressed in the ratio of the number of signals stored in shift register 13 to 1.

It should be understood, of course, that the foregoing disclosure relates to only preferred embodiments of the invention and that it is intended to cover all changes and modifications of the examples of the invention herein chosen for the purposes of the disclosure which do not constitute departures from the spirit and scope of the invention.

What is claimed is:

1. Apparatus for time compressing digital data signals comprising:

an input terminal for receiving serial digital data signals, a serial digital shift register having *n* stages and an input, gating means connected between said input terminal and said register input and arranged to pass signals at said terminal to said register when energized by a control signal, delay means having an input and *n* equally spaced output taps and being arranged to produce signals at each of said output taps in sequentially-timed relationship in response to receipt of a signal at its said input, a pulse generator arranged to periodically and simultaneously supply said gating means with a control signal and said delay means with an input, said delay means having a total delay time equal to or less than the period of said pulse generator,

*n* coincidence gating means each having two inputs and an output and arranged to produce signals at their outputs when signals are present at both of said two inputs, each of said coincidence means having one of its two inputs connected to a respective one of said delay means output taps and the other of its two inputs to a respective one of said shift register stages, all of said coincidence means outputs being connected to a common output terminal whereby all data in said register is read out at said common output terminal during each period of said pulse generator.

2. The apparatus of claim 1 wherein said delay means comprises a lumped-constant delay line.

3. Apparatus for time compressing digital data signals comprising:

an input terminal for receiving serial digital data signals, a serial digital shift register having *n* stages and an input, gating means connected between said input terminal and said register input and arranged to pass signals at said terminal to said register when energized by a control signal, delay means having *n* equally spaced taps,

*n* coincidence gating means each having two inputs and an output and arranged to produce signals at their respective outputs when signals are present at both of said two inputs, each of said *n* coincidence gating means having one of its two inputs connected to a respective one of said *n* register stages, all of the other of said two coincidence means inputs being connected to a common terminal, a pulse generator arranged to periodically and simultaneously supply a control signal to said gating means and a signal to said common terminal, each of said coincidence gating means outputs being connected to a respective one of said delay means taps, said delay means having a total delay time equal to or less than the period of said pulse generator, the tap of said delay means which is representative of the greatest delay time being the output of said apparatus whereby all data in said register is read out at said tap during each period of said pulse generator.

4. The apparatus of claim 3 wherein said delay means comprises a lumped-constant delay line.

References Cited

UNITED STATES PATENTS

| | | | |
|---|---|---|---|
| 2,635,229 | 4/1953 | Gloess et al. | 340—167 |
| 3,105,197 | 9/1963 | Aiken | 328—154 |
| 3,239,813 | 3/1966 | Spruth | 340—167 X |

NEIL C. READ, *Primary Examiner.*

D. YUSKO, *Assistant Examiner.*